US008539031B2

(12) United States Patent
Comertoglu et al.

(10) Patent No.: US 8,539,031 B2
(45) Date of Patent: Sep. 17, 2013

(54) DISPLAYING IMAGES FOR PEOPLE ASSOCIATED WITH A MESSAGE ITEM

(75) Inventors: Can Mehmet Comertoglu, Redmond, WA (US); Andrew T. Dean, Woodinville, WA (US); Autumn Lee Stroupe, Issaquah, WA (US); Owen Braun, Seattle, WA (US); Adriana Cristina Popp, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 12/147,825

(22) Filed: Jun. 27, 2008

(65) Prior Publication Data
US 2009/0327433 A1 Dec. 31, 2009

(51) Int. Cl.
*G06F 15/16* (2006.01)

(52) U.S. Cl.
USPC .......................................... 709/206; 709/203

(58) Field of Classification Search
USPC .................................................. 709/203, 206
See application file for complete search history.

(56) References Cited

U.S. PATENT DOCUMENTS

| | | | |
|---|---|---|---|
| 5,432,525 A | 7/1995 | Maruo | |
| 5,907,324 A * | 5/1999 | Larson et al. | 715/753 |
| 6,252,588 B1 | 6/2001 | Dawson | |
| 6,421,672 B1 | 7/2002 | McAllister | |
| 6,608,636 B1 * | 8/2003 | Roseman | 715/753 |
| 7,149,503 B2 * | 12/2006 | Aarnio et al. | 455/414.1 |
| 7,350,144 B2 * | 3/2008 | Burg et al. | 715/273 |
| 7,450,567 B1 * | 11/2008 | Mamnani | 370/352 |
| 7,451,389 B2 * | 11/2008 | Huynh et al. | 715/230 |
| 7,596,102 B2 * | 9/2009 | Forbes et al. | 370/260 |
| 7,634,065 B2 * | 12/2009 | Fukunaga et al. | 379/88.13 |
| 7,647,559 B2 * | 1/2010 | Yozell-Epstein et al. | 715/752 |
| 7,685,530 B2 * | 3/2010 | Sherrard et al. | 715/764 |
| 7,847,815 B2 * | 12/2010 | Patel et al. | 348/14.08 |
| 2003/0069874 A1 * | 4/2003 | Hertzog et al. | 707/1 |
| 2003/0158900 A1 | 8/2003 | Santos | |

(Continued)

FOREIGN PATENT DOCUMENTS

WO WO02054738 7/2002

OTHER PUBLICATIONS

Huggins, Diana, Website Article entitled, "Putting a Face on an Outlook 2007 Contact," printed May 23, 2007, 6 pgs.
Gruber, Frank, Website Article entitled, "Put a Face with an E-Mail with WHORYOU," printed Jul. 11, 2006; 3 pgs.
Williams, David, Website Article entitled, "Add Images to your Custom Outlook Forms," printed Jul. 19, 2001; 7 pgs.
Wilson, Michael, Website Article entitled, "Speech Recognition of Names by Exchange 2007 Unified Messaging," published Oct. 30, 2006; 13 pgs.

*Primary Examiner* — Carl Colin
*Assistant Examiner* — Mohammad A Siddiqi
(74) *Attorney, Agent, or Firm* — Hope Baldauff, LLC

(57) ABSTRACT

Technologies are described herein for displaying a list of people associated with a message item along with images and other personal context information in a PIM application. The people associated with the message item are identified and a list is generated containing a name, an image, and other personal context information for each. The list of people associated with the message item is displayed in a window of the PIM along with the information regarding the message item.

13 Claims, 7 Drawing Sheets

(56) References Cited

U.S. PATENT DOCUMENTS

| | | |
|---|---|---|
| 2004/0107251 A1 | 6/2004 | Wat |
| 2005/0118986 A1 | 6/2005 | Barton |
| 2006/0148455 A1 | 7/2006 | Kim |
| 2007/0035614 A1* | 2/2007 | Tamaru et al. ............. 348/14.08 |
| 2007/0150924 A1* | 6/2007 | Ichinose et al. ................. 725/78 |
| 2007/0195008 A1* | 8/2007 | Ueno et al. ..................... 345/1.1 |
| 2007/0268309 A1 | 11/2007 | Tanigawa |
| 2008/0046824 A1 | 2/2008 | Li |
| 2008/0240382 A1* | 10/2008 | Fujita-Yuhas ............. 379/88.16 |
| 2008/0294649 A1* | 11/2008 | Murata et al. ................... 707/10 |
| 2009/0190728 A1* | 7/2009 | Bushnell et al. .......... 379/88.17 |

* cited by examiner though the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of

DISPLAYING IMAGES FOR PEOPLE ASSOCIATED WITH A MESSAGE ITEM

BACKGROUND

Personal information manager (PIM) applications generally provide access to email, calendar events, and contacts to users of personal computers. However, as a part of an enterprise-wide office suite installation, a PIM may provide a centralized portal to business information and processes including communications, events, people, documents, and other business data. Often, instead of locating documents and business data through a file system, a user will access a document or other data based upon its association with an item in a PIM, such as a document attached to an email message or a report linked to a calendar event.

Many items maintained by a PIM are also associated with a number of people in an organization, such as attendees of meetings or recipients of email messages. Realizing the identities of people associated with an item is frequently important to understanding the context of the item or appreciating its importance. In this regard, PIMs may present the people associated with an item as a list of names or email addresses. In a large organization that employs many diverse individuals, a user viewing such a list of names or email addresses in the PIM may not be able to make a cognitive link between a name or email address and the actual identity of the person. For example, a user viewing the name of a recipient for an email message may not recognize the recipient, either because the user knows the person by a different, familiar name, or because the name is spelled differently than it is pronounced. Further, for a user viewing a list of attendees to an upcoming meeting, a simple list of email addresses provides no personal context by which the user can recognize and address the other attendees of the meeting.

It is with respect to these considerations and others that the disclosure made herein is presented.

SUMMARY

Technologies are described herein for displaying images for people associated with a message item, such as an email message or meeting item, in a PIM. Each person associated with a message item is displayed in a list along with a name, an image, and other personal context information, such as a title and an audio recording of the person's name. By providing images, audio recordings of names, and other personal context information in the list of people, a user of the PIM viewing the recipients of an email message or the attendees of a meeting is provided a means of easily recognizing the people associated with the message item and appreciating its context based upon the identities of the people associated with it.

According to aspects presented herein, a method for displaying a list of people associated with a message item in a PIM is provided. In one aspect, the people associated with the message item are invitees or attendees of a meeting. In another aspect, the people associated with the message item are recipients of an email message. The people associated with the message item in the PIM are identified, and a list is generated containing an entry for each person associated with the message item. Each entry includes the name of the corresponding person and an image associated with the person. In one aspect, the image associated with each person may be retrieved either from a local PIM storage or from an organization directory accessible by the PIM. The list of people associated with the message item is then displayed in a window of the PIM along with the information regarding the message item.

According to further aspects presented herein, each list entry may also include an additional line of personal information associated with the person, such as a title, and a user interface control that, when selected by a user, will play an audio recording of the person's name. The additional personal information may be retrieved from the local PIM storage or the organization directory. The audio recording associated with each person may also be retrieved from the local PIM storage or the organization directory. By providing an audio recording of each person's name, the pronunciation of the name can be known by each meeting attendee prior to a meeting.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
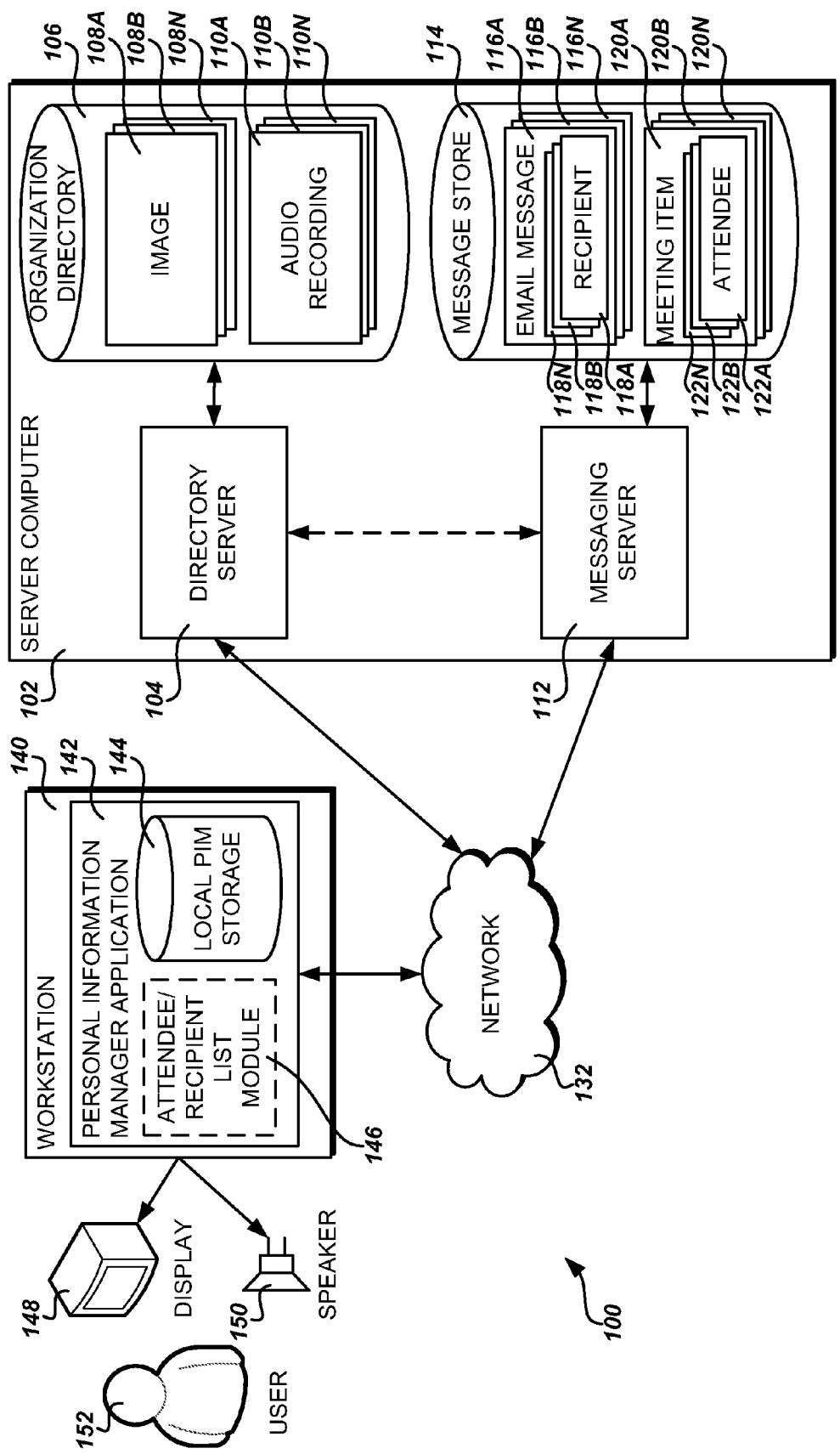
FIG. 1 is a block diagram showing aspects of an illustrative operating environment and several software components provided by the embodiments presented herein.

The following detailed description is directed to technologies for displaying a list of people associated with a message item along with images and other personal context information in a PIM application. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for displaying images for people associated with a message item in a PIM will be presented.

Turning now to FIG. 1, details will be provided regarding an illustrative operating environment and several software components provided by the embodiments presented herein. In particular, FIG. 1 illustrates an exemplary system 100 for displaying images and other personal context information for people associated with a message item in a PIM. The system 100 includes a workstation 140 that is connected to a display 148 allowing the workstation 140 to display a user interface (UI) to a user 152. The workstation 140 includes or is connected to a speaker 150 through which the workstation 140 may play audio recordings to the user 152.

It will be appreciated that the user 152 may access and operate the workstation 140 through any number of input and output devices, such as a computer monitor, keyboard, mouse, trackball, mouse pad, stylus, or touch-screen that may be directly connected to the workstation 140 or remotely connected via a network 132. It will be further appreciated that the workstation 140 illustrated in FIG. 1 may represent any computing device with which a user 152 may interact, including a desktop computer, notebook, laptop, tablet computer, ultra-mobile PC, server, or handheld device.

In one embodiment, a PIM application 142 executes on the workstation 140 that allows the user 152 to access and manage message items and other information. For example, the PIM 142 may provide access to email, voicemail, personal contacts, organizational contacts, meetings and other calendar events, and other personal or business data and processes. In one embodiment, the PIM 142 is the MICROSOFT® OFFICE OUTLOOK® messaging and collaboration client from MICROSOFT CORPORATION of Redmond, Wash. It should be appreciated, however, that the embodiments presented herein may be utilized with PIM application programs from other vendors, including but not limited to, IBM® LOTUS NOTES® software from IBM CORP. of Armonk, N.Y., NOVELL® GROUPWISE® software from NOVELL, INC. of Waltham, Mass., or MICROSOFT® ENTOURAGE® e-mail and personal information manager, also from MICROSOFT CORPORATION.

The PIM 142 is connected through a network 132 to a messaging server 112 executing on a remote server computer 102. The messaging server 112 provides messaging and other information services to the PIM 142. In one embodiment, the messaging server 112 is the MICROSOFT® EXCHANGE SERVER messaging server from MICROSOFT CORPORATION. As will be appreciated by one skilled in the art, the messaging server 112 may be any messaging server known in the art capable of providing the messaging services described herein to the PIM 142, such as IBM® LOTUS® DOMINO® software from IBM CORP. or NOVELL® GROUPWISE® from NOVELL, INC.

The messaging server 112 is further connected to a message store 114. The message store 114 stores message items for access by users 152 of the PIM 142. According to embodiments described herein, the message items stored in the message store 114 include email messages 116A-116N (may be collectively referred to herein as email message 116). Each of the email messages 116A-116N includes data identifying one or more recipients 118A-118N (may be collectively referred to herein as recipient 118) of the email message, which will be further illustrated below in FIG. 3. The message store 114 also includes meeting items 120A-120N (may be collectively referred to herein as meeting item 120), such as meeting invitations, meeting reminders, or calendar events related to meetings. Each of the meeting items 120A-102N includes data identifying one or more attendees 122A-122N (may be collectively referred to herein as attendee 122) of the meeting.

It will be appreciated by one skilled in the art that both email messages 116A-116N and meeting items 120A-120N may be stored in the message store 114 using a common data table or schema. The message store 114 may also store other items such as text messages, voicemails, faxes, contacts, tasks, notes, non-meeting related calendar events, and other personal or business data beyond that which is illustrated in FIG. 1. The message store 114 may be located on the server computer 102 or on a remote storage device accessible by the messaging server 112.

According to embodiments, the PIM 142 is connected to a directory server 104 through the network 132. The directory server 104 also executes on a remote server computer 102 and provides access by the PIM 142 to names, descriptions, locations, and other pertinent information regarding people and resources within an organization. In one embodiment, the directory server 104 is the MICROSOFT® ACTIVE DIRECTORY® directory service from MICROSOFT CORPORATION. It will be further appreciated that the directory server 104 may be any directory server that will allow access by the PIM 142 to information associated with people in the organization, including any server known in the art that supports the Lightweight Directory Access Protocol (LDAP).

The information regarding the people and resources is stored within an organization directory 106 that is accessible by the directory server 104. In one embodiment, the organization directory 106 contains images 108A-108N (collectively referred to herein as image 108) associated with people in the organization. Each of the images 108A-108N may be a digital picture of the associated person or of some other picture or image chosen by the person to visually represent that person in the organization. It will be appreciated that an image 108 may be any graphic image chosen by a person or an administrator to be associated with the person.

In a further embodiment, the organization directory 106 also contains audio recordings 110A-110N (collectively referred to herein as audio recording 110) associated with people in the organization. Each of the audio recordings 110A-110N may be used to provide an audible playback of an associated person's name or some other audible message or recording selected by the person or an administrator to represent that person. The audio recordings 110A-110N may be played to the user 152 in conjunction with the list of people associated with a message item, as will be described in more detail below in regard to FIG. 2.

In one embodiment, the audio recordings 110A-110N may be stored and managed in the organization directory 106 by a voicemail service for the organization, such as the EXCHANGE UNIFIED MESSAGING component of MICROSOFT EXCHANGE SERVER from MICROSOFT CORPORATION. It will be appreciated that the audio recordings 110A-110N may be stored in a number of locations other than the organization directory 106 illustrated in FIG. 1, including a voicemail store, the message store 114, or other location accessible by the PIM 142.

As will be appreciated by those skilled in the art, while the directory server 104 and messaging server 112 are illustrated in FIG. 1 as executing on a single server computer 102, these components may execute on disparate server computers 102 connected to each other over the network 132. It will be further appreciated that access to the data and services of the directory server 104 may be provided to the PIM 142 through the messaging server 112, as opposed to direct connections to the PIM 142 as illustrated in FIG. 1.

According to one embodiment, the network 132 comprises a LAN. However, it will appreciated that the network 132 may comprise a WAN, the Internet, or other type of network configured to allow the PIM 142 located on the workstation 140 to communicate with the messaging server 112 and directory server 104 executing on the server computer(s) 102. It will be further appreciated that many more networks and network connections may be utilized than illustrated in FIG. 1.

The PIM 142 executing on the workstation 140 includes an attendee/recipient list module 146 that performs the operations of displaying a list of people, which will be described in detail below. In one embodiment, the functionality of the attendee/recipient list module 146 is provided by the PIM 142. It will be appreciated, however, that the attendee/recipient list module 146 may be provided as an add-in module for the PIM 142 that utilizes an application programming interface (API) provided by the PIM 142 to access the data from the directory server 104 and messaging server 112 and to display the list of people 216 as part of the UI of the PIM 142. According to further embodiments presented herein, the PIM 142 caches data regarding message items, images 108A-108N, audio recordings 110A-110N, and other information in a local PIM storage 144 that is also located on the workstation 140, as will be discussed in more detail below in regard to FIG. 5.

Figure 2:
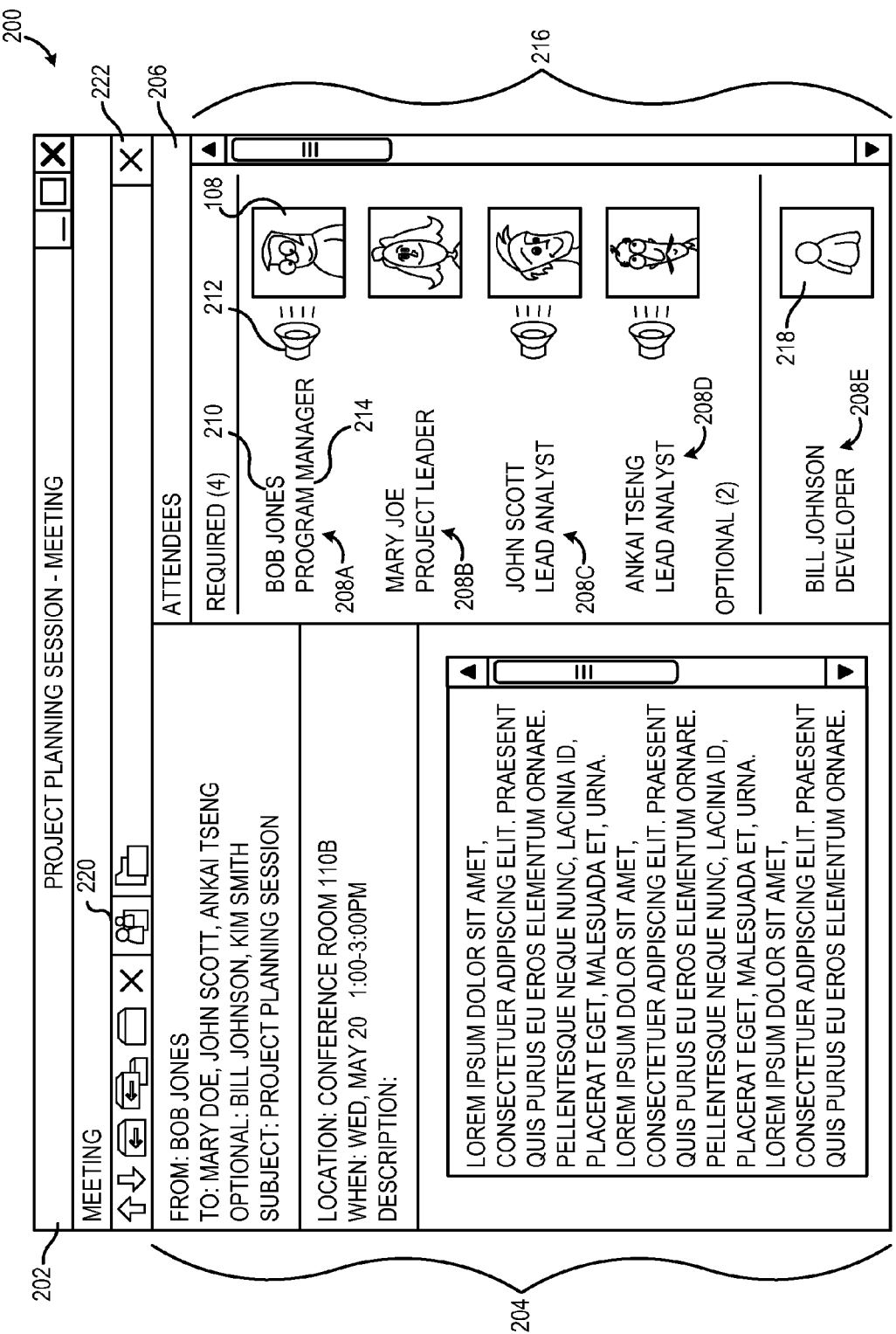
FIGS. 2-3 are screen diagrams showing exemplary user interfaces for displaying a list of people associated with a message item, according to embodiments described herein.
Figure 3:
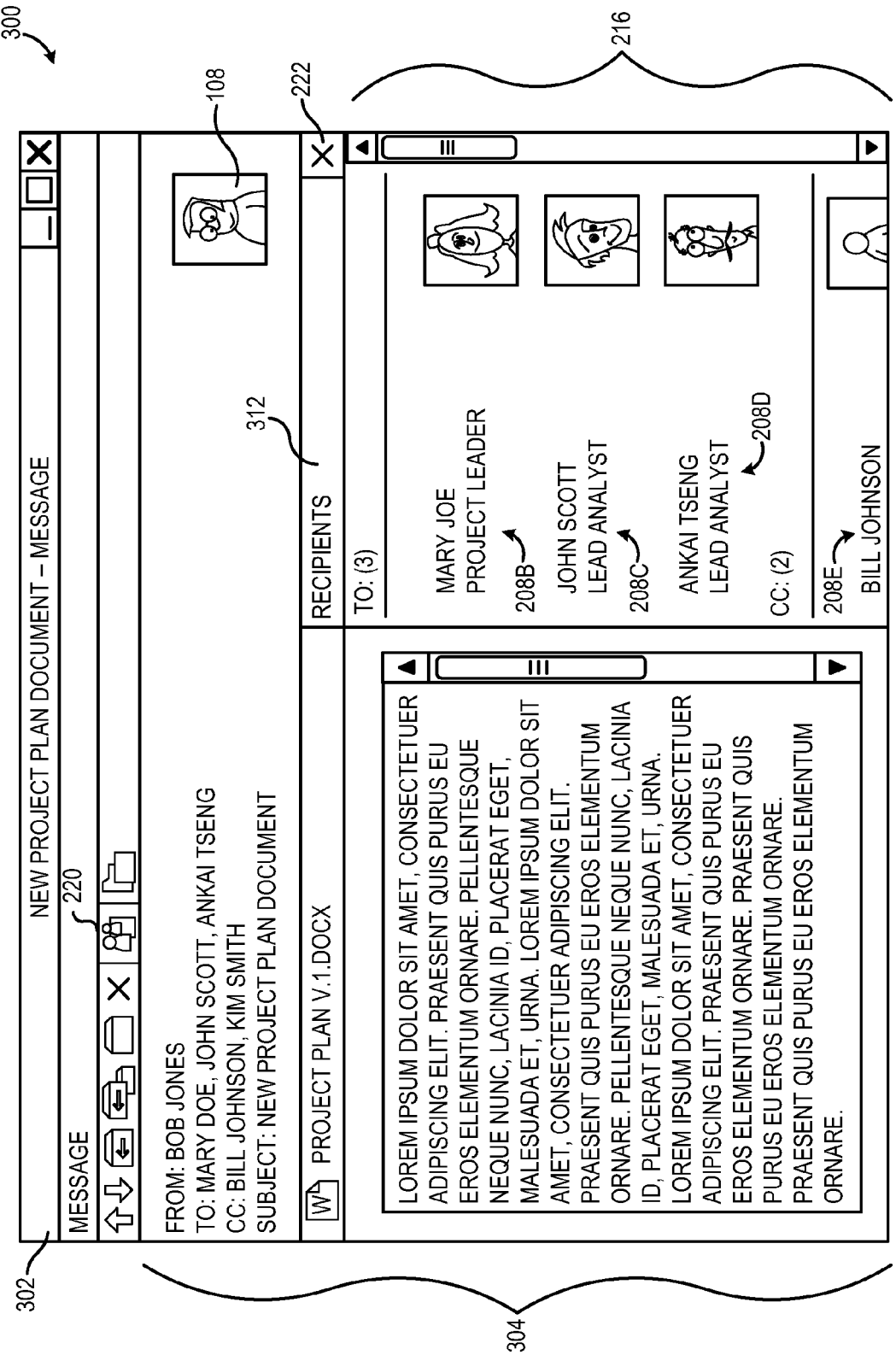

FIGS. 2-3 are screen diagrams illustrating a UI generated by the attendee/recipient list module 146 and the PIM 142 for displaying a list of people 216 associated with a message item, according to embodiments. In particular, FIG. 2 illustrates a UI 200 generated by the attendee/recipient list module 146 and PIM 142 in conjunction with the display of data regarding one of the meeting items 120A-120N in the message store 114. The UI 200 consists of a window 202 displayed by the PIM 142 that contains the meeting information 204, such as the location, date and time, and description from the meeting item 120. Also displayed in the meeting information 204 is data identifying the attendees 122A-122N of the meeting. The attendees 122A-122N may be identified in the meeting information 204 by name, email address, some other identifier, or a combination thereof.

As will be described in detail below in regard to FIG. 4, the attendee/recipient list module 146 determines the attendees 120A-120N of the meeting item 120 being displayed by the PIM 142 and generates a list of people 216 that is displayed in a pane 206 of the window 202. The list of people 216 consists of list entries 208A-208E (may be collectively referred to herein as list entry 208) for each of the attendees 122A-122N. A scroll bar 217 adjacent to the pane 206 allows the user 152 to scroll the list entries 208A-208E within the pane 206 to view all attendees 122A-122N in the list. Each of the list entries 208A-208E includes a name 210 and an image 108 representing the corresponding attendee 122. According to one embodiment, if an image 108 is not available for an attendee 122, the attendee/recipient list module 146 displays a placeholder image 218 in the list entry 208E for that attendee 122. The placeholder image 218 may be a graphic image that indicates to the user 152 the lack of availability of an image for the attendee 122, or it may simply be an empty or "blank" graphic.

In one embodiment, each of the list entries 208A-208E also includes additional personal information 214 associated with the attendee 122. The additional personal information 214 may be a title of the attendee 122, as illustrated in FIG. 2, or any other data regarding the attendee 122 that the attendee/recipient list module 146 may display in the list entry 208A-208E when generating the list of people 216. The attendee/recipient list module 146 may retrieve the additional personal information 214 from the local PIM storage 144, the message store 114, the organization directory 106, or any other data source available to the PIM 142. In a further embodiment, the attendee/recipient list module 146 is configurable so that an organization may specify the source of data displayed as additional personal information 214 in the list entries 208A-208E.

According to a further embodiment, each of the list entries 208A-208E may also include a pronunciation UI control 212. The attendee/recipient list module 146 will determine whether an audio recording 110 related to each of the attendees 122A-122N in the list of people 216 is available, as will be described in detail below in regard to FIG. 6, and display the pronunciation UI control 212 for each of the attendees 122A-122N accordingly. The pronunciation UI control 212 is configured to cause the audio recording 110 related to the attendee 122 to be played through the speaker 150 attached to the workstation 140 when the UI control 212 is selected. The pronunciation UI control 212 may be a graphical icon that is selected by the user 152 clicking it with a mouse connected to the workstation. It should be appreciated that, although the use of a mouse is described in the examples presented, any suitable user input devices may be utilized to allow users to select and interact with the UI controls described herein.

The attendee/recipient list module 146 may group the list entries 208A-208E in the list of people 216 according to different types of attendees 122A-122N of the meeting item 120 as stored in the message store 114. For example, as illustrated in FIG. 2, the attendee/recipient list module 146 groups the list entries 208A-208E into "required" attendee list entries 208A-208D and "optional" attendee list entries 208E. The list of people 216 may also contain an organizer and other resources associated with the meeting item 120. It will be appreciated that the grouping of list entries 208A-208E within the list of people 216 will depend upon the functionality of the PIM 142 and the format of the data within the message store 114.

According to one embodiment, the display of the list of people 216 in the window 202 of the PIM 142 is optional. The user 152 is provided with a show attendee list UI control 220 that allows the user to toggle the display of the list of people 216. The show attendee list UI control 220 may be a graphic icon displayed in a toolbar of the window 202 which toggles the display of the list of people 216 on and off when selected by the user 152 using the mouse. In addition, a close UI control 222 may also be provided which closes the pane 206 containing the list of people 216 when selected by the user 152.

FIG. 3 illustrates a UI 300 generated by the attendee/recipient list module 146 and PIM 142 in conjunction with the display of data regarding one of the email messages 116A-116N in the message store 114, according to a further embodiment. The UI 300 consists of a window 302 displayed by the PIM 142 which contains the email information 304, such as the name or email address of the sender and the recipients 118A-118N, the subject, any file attachments, and the body of the email message. The window 302 may also display an image 108 related to the sender. Just as in the example illustrated above, the attendee/recipient list module 146 displays the list of people 216 in a pane 312 of the window 302. The list of people 216 contains list entries 208B-208E for each of the recipients 118A-118N of the email message 116. A scroll bar 314 adjacent to the pane 312 allows the user 152 to scroll the list entries 208B-208E within the pane 312 to view all recipients 118A-118N in the list.

According to one embodiment, when displayed in conjunction with one of the email messages 116A-116N, the list entries 208B-208E of the list of people 216 do not include the pronunciation UI controls 212 depicted in FIG. 2. Further, the grouping of the list entries 208B-208E in the list of people 216 may differ from that illustrated in FIG. 2, based upon the types of recipients 118A-118N of the email message 116 specified in the message store 114. For example, as illustrated in FIG. 3, the attendee/recipient list module 146 groups the list entries 208B-208E into "to" recipient list entries 208B-208D and "cc" recipient list entries 208E. The list of people 216 may also contain "bcc" recipients.

While the list of people 216 is illustrated in FIGS. 2-3 as being displayed in conjunction with a meeting item 120 or email message 116, it will be appreciated that the attendee/recipient list module 146 may generate a list of people 216 in conjunction with the display of any type of message item in the message store 114 which is associated with a number of people. Further, many variations in the layout of the name 210, image 108, and other information and UI controls displayed in the list of people 216 will be apparent to those of ordinary skill in the art, and this application is intended to cover any such variations beyond those illustrated in FIGS. 2-3.

Figure 4:
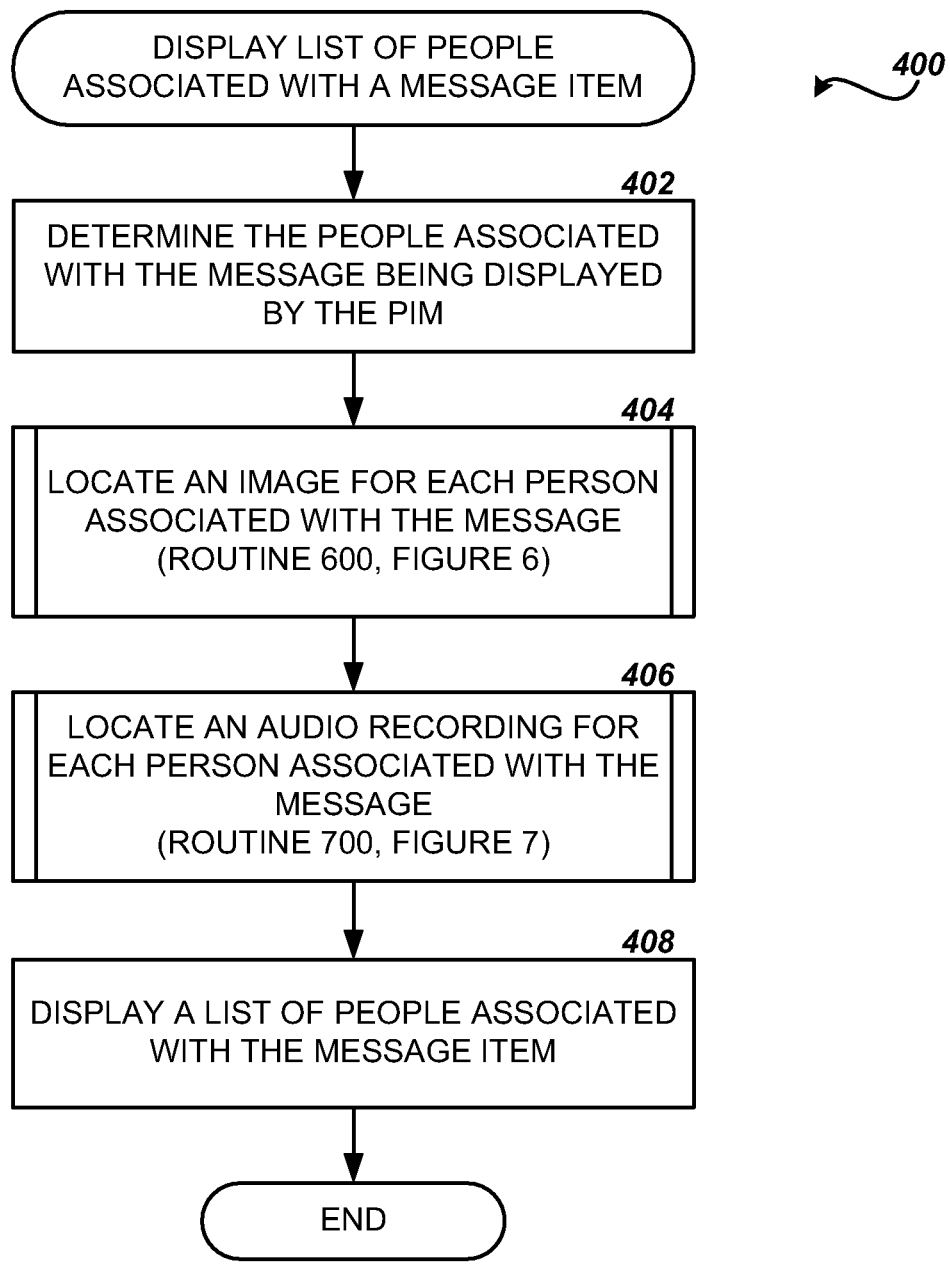
FIG. 4 is a flow diagram showing one method for displaying a list of people associated with a message item, as provided in the embodiments described herein.
Figure 5:
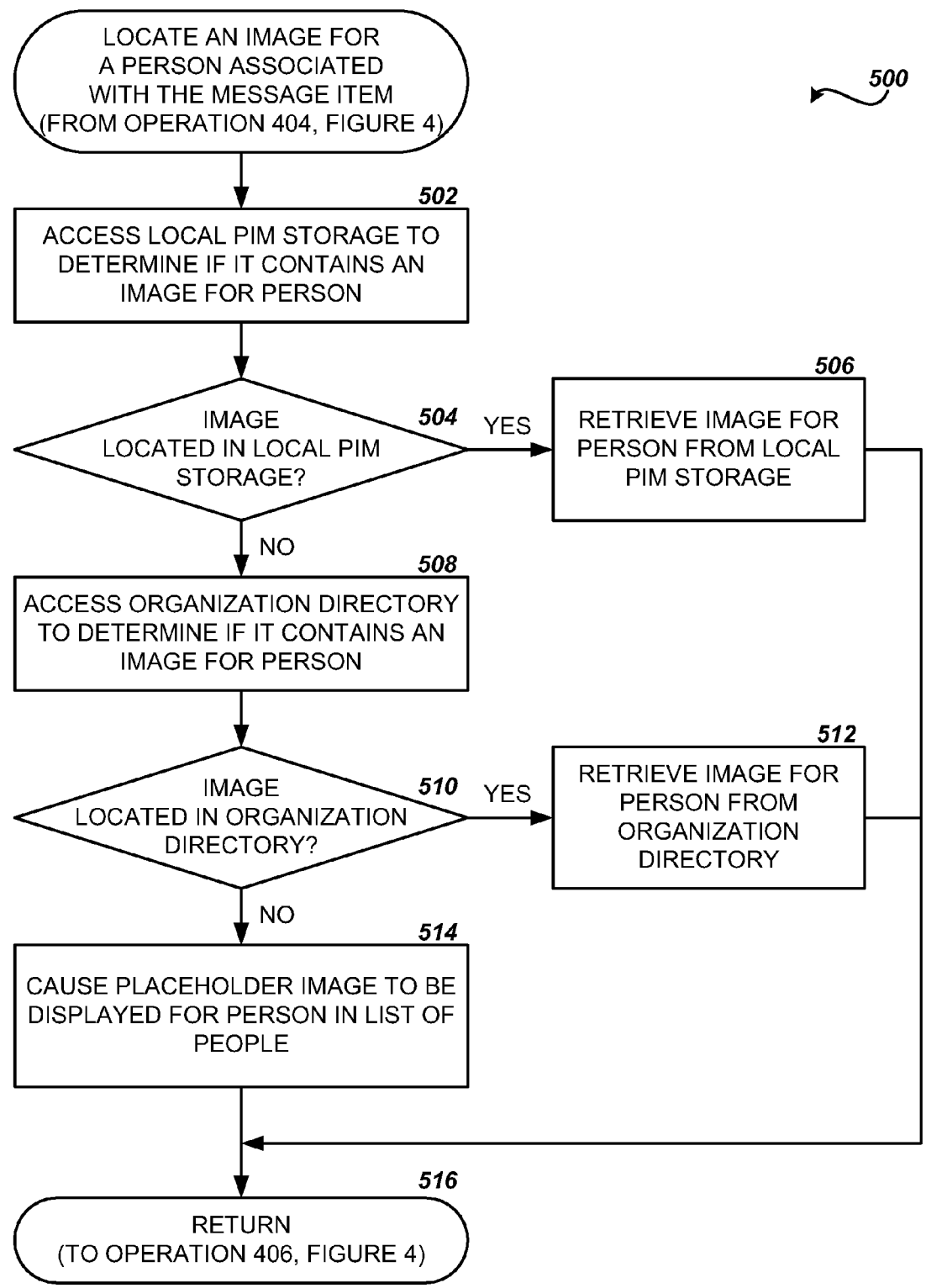
FIG. 5 is a flow diagram showing one method for locating an image for a person associated with a message item, as provided in the embodiments described herein.
Figure 6:
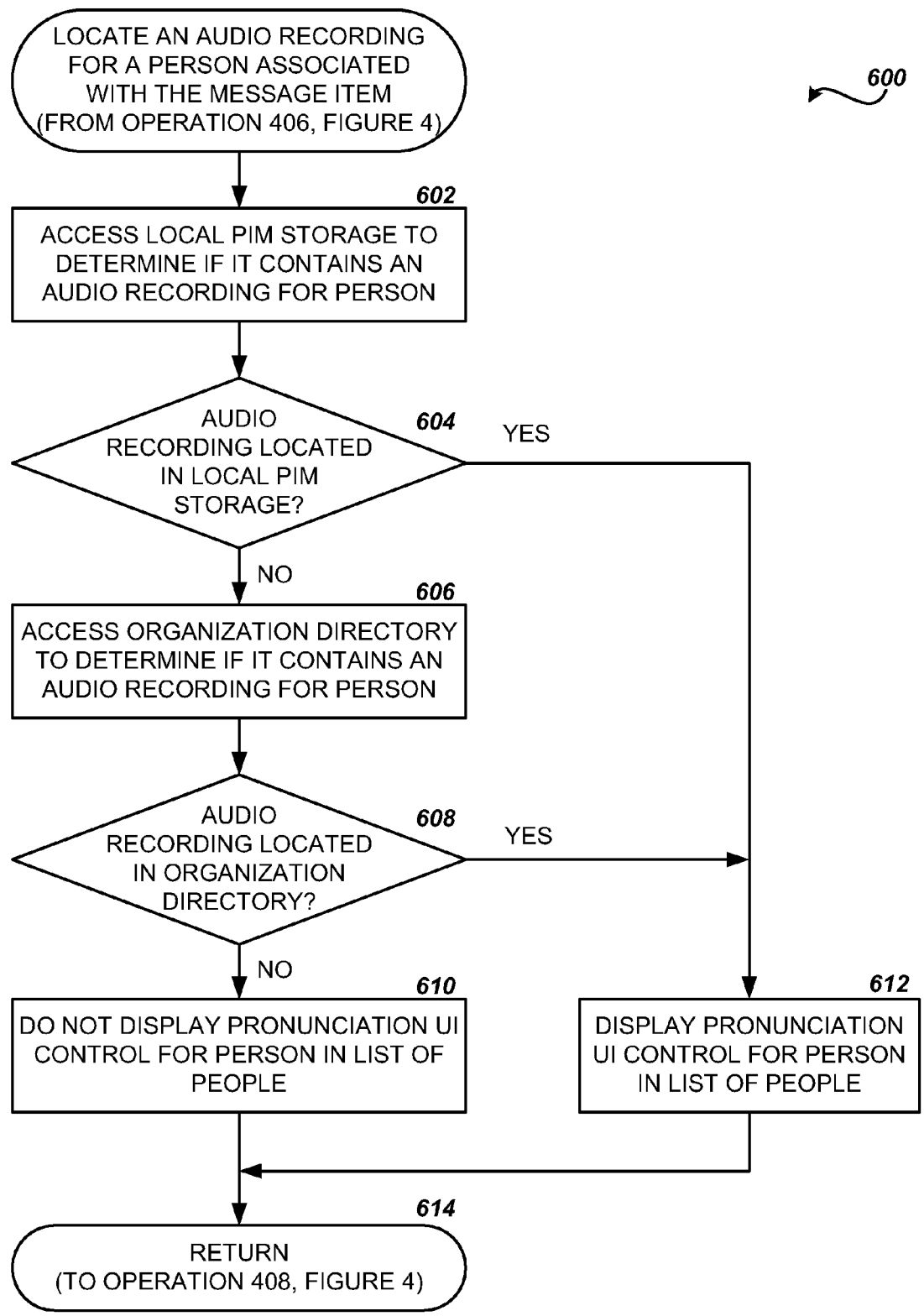
FIG. 6 is a flow diagram showing one method for locating an audio recording for a person associated with a message item, as provided in the embodiments described herein.

Referring now to FIGS. 4-6, additional details will be provided regarding the embodiments presented herein. In particular, FIG. 4 is a flow diagram showing one method for displaying a list of people associated with a message item. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the attendee/recipient list module 146 determines the people associated with the message item being displayed by the PIM 142. As described above, this may be attendees 122A-122N of one of the meeting items 120A-120N, recipients 118A-118N of one of the email messages 116A-116N, or some other group of people associated with a message item in the message store 114. In one embodiment, the attendee/recipient list module 146 retrieves a unique identifier for each person associated with the message item. For example, the attendee/recipient list module 146 may retrieve the email addresses of all attendees 122A-122N of the currently displayed meeting item 120. Each attendee email address may uniquely identify a person associated with the meeting item 120 to be included in the list of people 216. This may be accomplished by a calling an API of the PIM 142 to retrieve data regarding the currently displayed message item. In another embodiment, the attendee/recipient list module 146 may retrieve the data from the message item stored in the message store 114. It will be appreciated that the manner by which the attendee/recipient list module 146 may determine the unique identifiers for each person associated with a message item will vary depending upon the type of the message item as well as the PIM 142 in which the message item is being displayed.

From operation 402, the routine proceeds to operation 404, where the attendee/recipient list module 146 locates an image 108 for each person determined to be associated with the message item, as will be described in more detail below in regard to FIG. 5. The routine 400 then proceeds to operation 406 where the attendee/recipient list module 146 locates an audio recording 110 for each person associated with the message item, as described in detail below in regard to FIG. 6. In one embodiment, once an image 108 and audio recording 110 have been located for each person associated with the message item, the routine 400 proceeds to operation 408.

In another embodiment, the attendee/recipient list module 146 executes the respective retrieval operations 404 and 406 for the image 108 and audio recording 110 on background threads. The attendee/recipient list module 146 will display a temporary placeholder image 218 or blank image in the list of people 216 for the person and no pronunciation UI control 212 is displayed. When the image retrieval operation 404 executing on the background thread is completed, the attendee/recipient list module 146 will update the image 108 in the list of persons 216 with the retrieved image 108 corresponding to the person. Similarly, once the audio recording retrieval operation 406 has completed, the attendee/recipient list module 146 will add a pronunciation UI control 212 to the list of persons 216 for that person if an audio recording 110 corresponding to the person was found.

At operation 408, the attendee/recipient list module 146 displays the list of people 216 associated with the message item currently displayed in the PIM 142. The attendee/recipient list module 146 retrieves the name 210, and optionally the additional personal information 214, for each person associated with the message item, from the PIM 142, the local PIM storage 144, the message store 114, or the organization directory 106 utilizing the unique identifier identified for each person in operation 402. The attendee/recipient list module 146 then uses the name 210, image 108 from operation 404, and additional personal information 214 to render a list entry 208A-208E in the list of people 216 for each person associated with the message item. If it was determined that an audio recording 110 exists for a person in operation 406, the attendee/recipient list module 146 displays a pronunciation UI control 212 in the corresponding list entry 208A-208E and configures the control to play the audio recording 110 when selected by the user 152.

FIG. 5 is a flow diagram illustrating further aspects of the operation 404 described above for locating an image 108 for a person associated with the message item. The routine 500 begins at operation 502 where the attendee/recipient list module 146 accesses the local PIM storage 144 to determine if an image 108 for the person exists in the PIM cache. As described above in regard to FIG. 1, the PIM 142 caches certain information retrieved from the message store 114, organization directory 106, and other data sources in the local PIM storage 144, according to one embodiment. The local PIM storage 144 may be stored on the workstation 140 in either volatile storage, non-volatile storage, or some combination of the two.

When a data item related to a person, such as image 108 or audio recording 110, is retrieved by the PIM 142, it will be temporarily cached in the local PIM storage 144 for subsequent access. The data items in the cache are identified using the same unique identifier determined by the attendee/recipient list module 146 to identify the person associated with the message item, such as the email address. It will be appreciated that the duration and method of caching various data items in the local PIM storage 144 will vary based upon the PIM 142 being executed on the workstation 140.

The attendee/recipient list module 146 utilizes the unique identifier determined for the person in operation 402 to search the local PIM storage 144 for an image 108. At operation 504, if an image 108 related to the person is located in the local PIM storage 144, the routine 500 proceeds to operation 506 where the image 108 is retrieved from the local PIM storage 144 to be utilized by the attendee/recipient list module 146 to display the list of people 216. The routine 500 then proceeds from operation 506 to operation 516 where the routine 500 returns.

If, at operation 504, an image 108 related to the person is not located in the local PIM storage 144, then the routine 500 proceeds to operation 508, where the attendee/recipient list module 146 accesses the organization directory 106 to determine if an image 108 for the person is available. As described above in regard to FIG. 1, the attendee/recipient list module 146 may access the organization directory 106 through a direct request to the directory server 104, or requests for information from the organization directory 106 may be processed through the messaging server 112, depending upon the PIM 142, messaging server 112, and directory server 104 being utilized. The attendee/recipient list module 146 utilizes the unique identifier determined for the person associated with the message item to search the organization directory 106 for an image 108 related to that person.

At operation 510, if an image 108 related to the person is located in the organization directory 106, the routine 500 proceeds to operation 512 where the image 108 is retrieved from the organization directory 106 to be utilized by the attendee/recipient list module 146 to display the list of people 216. The routine 500 then proceeds from operation 512 to operation 516 where the routine 500 returns. If an image 108 related to the person is not located in the organization directory 106, then the routine 500 proceeds from operation 510 to operation 514, where a placeholder image 218 or blank image is substituted for the image 108 to be displayed in the list of people 216, as illustrated above in FIG. 2. From operation 514, the routine 500 proceeds to operation 516 where the routine 500 returns.

FIG. 6 is a flow diagram illustrating further aspects of the operation 406 described above for locating an audio recording 110 related to a person associated with the message item. The routine 600 begins at operation 602 where the attendee/recipient list module 146 accesses the local PIM storage 144 to determine if an audio recording 110 related to the person has been cached by the PIM 142. An audio recording 110 may be cached in the local PIM storage 144 if it had been recently retrieved and played by the PIM 142 in response to a user selecting a pronunciation UI control 212, for example. The attendee/recipient list module 146 utilizes the unique identifier determined for the person in operation 402 to search the local PIM storage 144 for the audio recording 110.

If, at operation 604, an audio recording 110 related to the person is located in the local PIM storage 144, the routine 600 proceeds to operation 612 where the attendee/recipient list module 146 adds a pronunciation UI control 212 to the list entry 208A-208E for the person in the list of people 216. The attendee/recipient list module 146 also configures the pronunciation UI control 212 to play the audio recording 110 from the local PIM storage 144 when selected by the user. If, however, an audio recording 110 is not located in the local PIM storage 144, the routine 600 proceeds from operation 604 to operation 606 where the attendee/recipient list module 146 accesses the organization directory 106 to determine if an audio recording 110 related to the person is available. Just as described above in regard to operation 508, the attendee/recipient list module 146 may access the organization directory 106 through a direct request to the directory server 104, or requests for information from the organization directory 106 may be processed through the messaging server 112, depending upon the PIM 142, messaging server 112, and directory server 104 being utilized. The attendee/recipient list module 146 utilizes the unique identifier determined for the person to search the organization directory 106 for an audio recording 110 related to the person.

At operation 608, if an audio recording 110 related to the person is located in the organization directory 106, then the routine 600 proceeds to operation 612 where the attendee/recipient list module 146 adds a pronunciation UI control 212 to the list entry 208 for the person in the list of people 216. The attendee/recipient list module 146 further configures the pronunciation UI control 212 to retrieve and play the audio recording 110 from the organization directory 106. If, an audio recording 110 related to the person is not located in the organization directory 106, the routine 600 proceeds from operation 608 to operation 610, where the attendee/recipient list module 146 ensures a pronunciation UI control 212 is not displayed in the list entry 208A-208E for the person in the list of people 216. From operation 610, the routine 600 proceeds to operation 614 where the routine 600 returns.

Figure 7:
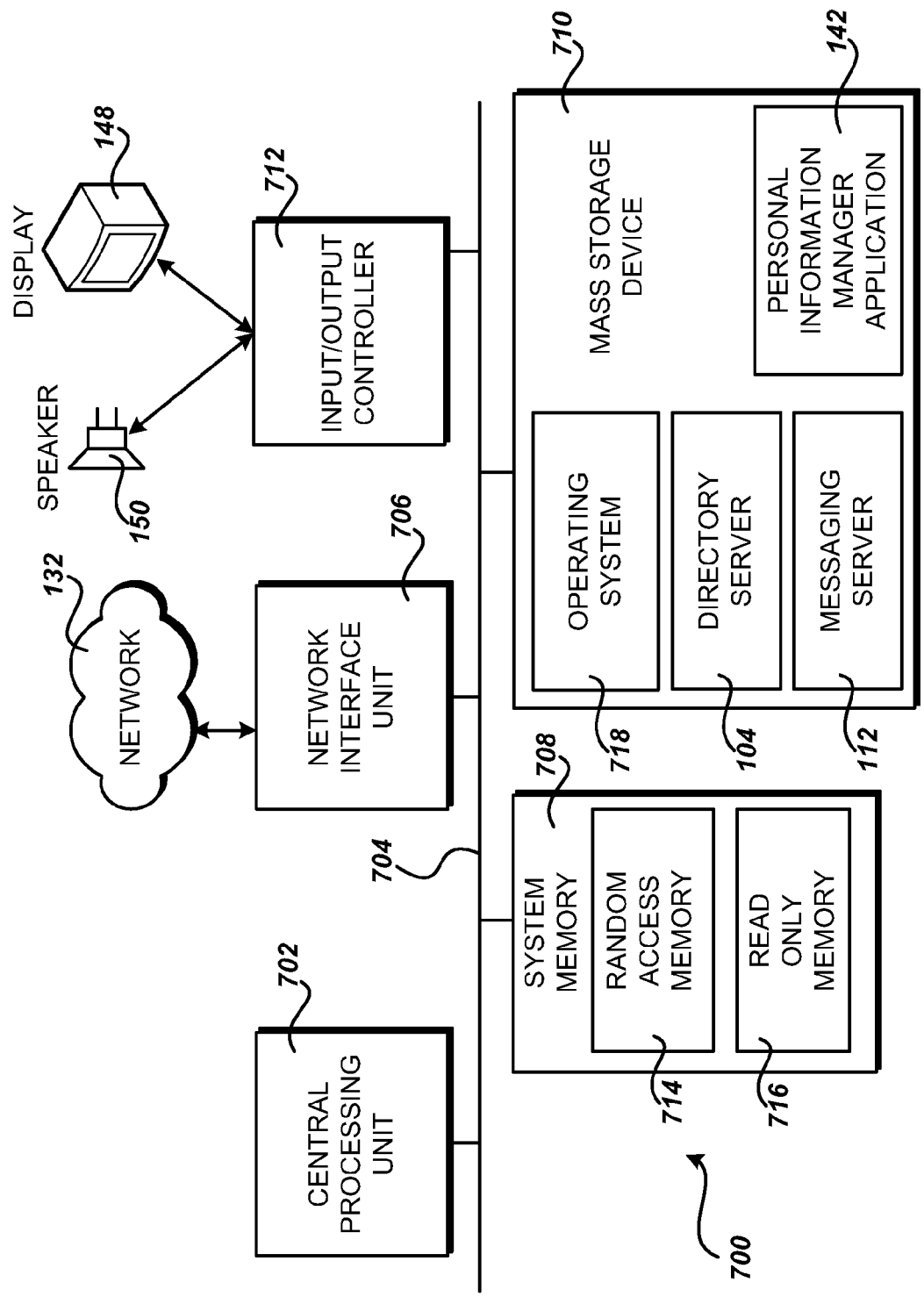
FIG. 7 is a block diagram showing an illustrative computer hardware and software architecture for a computing system capable of implementing aspects of the embodiments presented herein.

FIG. 7 shows an illustrative computer architecture for a computer 700 capable of executing the software components described herein for displaying a list of people associated with a message item in the manner presented above. The computer architecture shown in FIG. 7 illustrates a conventional desktop, laptop, or server computer and may be utilized to execute any aspects of the software components presented herein described as executing on the workstation 140 or server computer 102.

The computer architecture shown in FIG. 7 includes a central processing unit 702 (CPU), a system memory 708, including a random access memory 714 (RAM) and a read-only memory 716 (ROM), and a system bus 804 that couples the memory to the CPU 702. A basic input/output system containing the basic routines that help to transfer information between elements within the computer 700, such as during startup, is stored in the ROM 716. The computer 700 also includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 700.

According to various embodiments, the computer 700 may operate in a networked environment using logical connections to remote computers through a network such as the network 132. The computer 700 may connect to the network 132 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display 148, a speaker 150, a printer, or other type of output device.

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store the PIM 142, directory server 104, or messaging server 112, each of which was described in detail above in regard to FIG. 1. The mass storage device 710 and the RAM 714 may also store other types of program modules or data.

Based on the foregoing, it should be appreciated that technologies for displaying a list of people associated with a message item along with images and other personal context information in a PIM application are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for displaying a list of people associated with a message item stored in a message store for use by a personal information manager (PIM) application, the computer-implemented method comprising performing computer-implemented operations for:
    identifying a plurality of people associated with the message item stored in the message store;
    upon identifying the plurality of people associated with the message item stored in the message store, accessing a local storage of the PIM to determine whether an image associated with each of the plurality of people is contained in the local storage;
    in response to determining that an image associated with one of the plurality of people is contained in the local storage, retrieving the image associated with the person from the local storage;
    in response to determining that an image associated with the person is not contained in the local storage, determining whether an image associated with the person is contained in an organization directory;
    in response to determining that an image associated with the person is contained in the organization directory, retrieving the image associated with the person from the organization directory; and
    in response to determining that an image associated with the person is not contained in the organization directory, causing a placeholder image to be displayed in the list entry for the person;
    generating a list of people comprising a list entry for each of the plurality of people, each list entry comprising a name, an image associated with a corresponding person associated with the message item, and a pronunciation user interface (UI) control, the pronunciation UI control configured to cause an audio recording of the name of the corresponding person to be played through a speaker connected to a computer executing the PIM when the pronunciation UI control is selected by a user of the computer; and
    displaying the list of people in conjunction with data regarding the message item stored in the message store in a window of the PIM;
    detect that a user of the computer has selected the pronunciation UI control of at least one list entry for the corresponding person;
    upon detecting that the user has selected the pronunciation UI control, determine whether the audio recording of the name of the at least one list entry is contained in a local storage of the PIM;
    in response to determining that the audio recording of the name of the at least one list entry is contained in the local storage, retrieve the audio recording of the name of the at least one list entry from the local storage and play the audio recording of the name of the at least one list entry through the speaker;
    in response to determining that the audio recording of the name of the at least one list entry is not contained in the local storage, determine whether the audio recording of the name of the at least one list entry is contained in an organization directory; and
    in response to determining that the audio recording of the name of the at least one list entry is contained in the organization directory, retrieve the audio recording of the name of the at least one list entry from the organization directory and play the audio recording of the name of the at least one list entry through the speaker.

2. The computer-implemented method of claim 1, wherein the message item stored in the message store comprises a meeting request and the plurality of people associated with the message item stored in the message store comprise attendees of the meeting.

3. The computer-implemented method of claim 1, wherein the message item stored in the message store comprises an email message and the plurality of people associated with the message item stored in the message store comprises recipients of the email message.

4. The computer-implemented method of claim 1, wherein each list entry further comprises additional personal information associated with the corresponding person.

5. The computer-implemented method of claim 4, wherein the additional personal information comprises a title.

6. The computer-implemented method of claim 4, wherein the additional personal information is retrieved from an organization directory.

7. A computer-readable storage medium that is not a signal having computer executable instructions stored thereon that, when executed by a computer, cause the computer to:
  identify a plurality of attendees associated with a meeting request in a PIM;
  access a local storage of the PIM to determine whether an image associated with each of the plurality of attendees is contained in the local storage;
  in response to determining that an image associated with one of the plurality of attendees is contained in the local storage, retrieve the image associated with the attendee from the local storage;
  in response to determining that an image associated with the attendee is not contained in the local storage, determine whether an image associated with the attendee is contained in an organization directory;
  in response to determining that an image associated with the attendee is contained in the organization directory, retrieve the image associated with the attendee from the organization directory; and
  in response to determining that an image associated with the attendee is not contained in the organization directory, cause a placeholder image to be displayed in the list entry for the attendee;
  generate a list of people comprising a list entry for each of the plurality of attendees, each list entry comprising a name and the image associated with a corresponding attendee, and at least one list entry a pronunciation UI control configured to cause an audio recording of the name associated with the corresponding attendee to be played through a speaker connected to the computer executing the PIM when the pronunciation UI control is selected by a user of the computer;
  display the list of people in a window of the PIM in conjunction with data regarding the meeting request;
  detect that the user of the computer has selected the pronunciation UI control of the at least one list entry for the corresponding attendee of the meeting;
  upon detecting that the user has selected the pronunciation UI control, determine whether the audio recording of the name associated with the corresponding attendee is contained in a local storage of the PIM;
  in response to determining that the audio recording of the name is contained in the local storage, retrieve the audio recording of the name from the local storage and play the audio recording of the name through the speaker;
  in response to determining that the audio recording of the name is not contained in the local storage, determine whether the audio recording of the name associated with the corresponding attendee is contained in an organization directory; and
  in response to determining that the audio recording of the name is contained in the organization directory, retrieve the audio recording of the name from the organization directory and play the audio recording of the name through the speaker.

8. The computer-readable storage medium of claim 7, wherein each list entry further comprises additional personal information associated with the corresponding attendee.

9. The computer-readable storage medium of claim 8, wherein the additional personal information comprises a title.

10. The computer-readable storage medium of claim 8, wherein the additional personal information is retrieved from an organization directory.

11. A computer-readable storage medium that is not a signal having computer executable instructions stored thereon that, when executed by a computer, cause the computer to:
  identify a plurality of recipients of an email message stored in a message store and displayed in a PIM;
  upon identifying the plurality of recipients of the email message, access a local storage of the PIM to determine whether an image associated with each of the plurality of recipients is contained in the local storage;
  in response to determining that an image associated with one of the plurality of recipients is contained in the local storage, retrieve the image associated with the recipient from the local storage;
  in response to determining that an image associated with the recipient is not contained in the local storage, determine whether an image associated with the recipient is contained in an organization directory;
  in response to determining that an image associated with the recipient is contained in the organization directory, retrieve the image associated with the recipient from the organization directory; and
  in response to determining that an image associated with the recipient is not contained in the organization directory, causing a placeholder image to be displayed in the list entry for the recipient;
  access a local storage of the PIM to determine whether additional personal information associated with each of the plurality of recipients is contained in the local storage;
  in response to determining that the additional personal information associated with the recipient is contained in the local storage, retrieve the additional personal information associated with the recipient from the local storage; and
  in response to determining that the additional personal information associated with the recipient is not contained in the local storage, retrieve the additional personal information associated with the recipient from an organization directory;
  generate an image of a sender of the email message and a list of people comprising a list entry for each of the plurality of recipients, each list entry comprising a name, an image, and the additional personal information associated with a corresponding recipient;
  generate a list of people comprising a list entry for each of the plurality of recipients, each list entry comprising a name and the image associated with a corresponding recipient of the email message, and a pronunciation UI control configured to cause an audio recording of the name associated with the corresponding recipient of the email message to be played through a speaker connected to the computer executing the PIM when the pronunciation UI control is selected by a user of the computer;
  detect that the user of the computer has selected the pronunciation UI control of the at least one list entry for the corresponding recipient of the email message;
  upon detecting that the user has selected the pronunciation UI control, determine whether the audio recording of the name associated with the corresponding recipient of the email message is contained in a local storage of the PIM;
  in response to determining that the audio recording of the name associated with the corresponding recipient is contained in the local storage, retrieve the audio recording of the name associated with the corresponding recipient from the local storage and play the audio recording of the name associated with the corresponding recipient through the speaker;

in response to determining that the audio recording of the name associated with the corresponding recipient is not contained in the local storage, determine whether the audio recording of the name associated with the corresponding recipient is contained in an organization directory; and in response to determining that the audio recording of the name associated with the corresponding recipient is contained in the organization directory, retrieve the audio recording of the name associated with the corresponding recipient from the organization directory and play the audio recording of the name associated with the corresponding recipient through the speaker; and display the image of the sender and the list of people in conjunction with the display of the email message in a window of the PIM.

12. The computer-readable storage medium of claim 11, wherein the additional personal information is configurable to contain any information for a recipient contained in the organization directory.

13. The computer-readable storage medium of claim 11, wherein the additional personal information comprises a title.

* * * * *